INVENTOR
PHILIPPE JAULMES
ATTORNEYS

United States Patent Office 3,539,249
Patented Nov. 10, 1970

3,539,249
SYSTEM FOR PROJECTING AND VIEWING
PICTURES TAKEN WITH A FISH - EYE
CAMERA
Philippe Jaulmes, 6 Rue Gerhardt, Montpelier,
Herault, France
Continuation-in-part of application Ser. No. 404,641,
Oct. 15, 1964. This application June 23, 1967, Ser.
No. 654,671
Claims priority, application France, Nov. 20, 1963,
954,429
Int. Cl. G03b 37/00
U.S. Cl. 352—69       6 Claims

ABSTRACT OF THE DISCLOSURE

An arrangement for projecting pictures taken with a fish-eye camera on a part-spherical viewing screen characterized by the fact that the focal point of a concave spherical mirror is positioned at the geometric center of the screen and a real image of said pictures is projected to said focal point.

---

This application is a continuation-in-part of my prior copending application Ser. No. 404,641, filed Oct. 15, 1964, and now abandoned.

My invention relates to a novel viewing room for moving pictures.

In my French Pat. No. 1,204,643 of Apr. 25, 1958, I have described a room for the projection and viewing of moving or static pictures, said room being characterized by the fact that it comprises:

(a) A substantially hemispheric screen located at the top part of said room, with its concave surface directed toward the bottom part of said room.

(b) A projector centrally located under said room, said projector being provided with a lens adapted to project on said hemispheric screen an image printed on a standard film which has been taken by a camera whose lens is of the same type as that which is utilized on said projector.

(c) Pivoted seats allowing the audience to assume various positions and to direct their line of vision toward all the parts of said screen.

In the first certificate of addition No. 73,605 of May 14, 1958, to the above-mentioned French patent, I have described a viewing room for moving pictures of the type described in said patent, said room being essentially characterized in that said projector, instead of being located under the viewing room, is located at the top of said room and projects vertically the film image downward. After said image has been reflected by a convex spherical mirror located in the axis of said projector and substantially the diametral horizontal plane of the hemispheric screen, it is reflected on said screen.

The present application has for its object an improvement to the moving pictures viewing room such as described in the above French patent, said improvement being characterized in that it provides a substantially hemispheric screen symmetrically disposed about an axis which may be oriented for example at 45° relative to the vertical, rather than about a vertical axis, as in the main patent and the first addition thereto, the diametral plane of this hemispheric screen remaining perpendicular to the new axis of symmetry.

According to the present application, the seats of said room include a head rest and are disposed in tiers or rows following straight parallel lines substantially included into the diametral plane of the screen.

Another feature of the new inventive device is that, instead of utilizing a convex spherical mirror, as in the main patent and the first addition thereto, a concave spherical mirror is utilized, said mirror being preferably located adjacent to the center of the screen, the deformed circular image of the film being projected on said mirror prior to being returned to said screen whereat said deformations are annulled.

The film image may be directly projected on said concave mirror, but, preferably, is projected through successive plane mirrors whose number varies as a function of the position desired for the projector, said number being chosen so as to erect the image projected on said screen.

The utilization of a concave mirror located slightly under the center of said screen with its focal point at or near said center, makes it possible to actually make the rays converge at the center of said screen and to decrease the angles of reflection of the light rays, thus improving the quality of the image on the screen even though the screen diameter remains the same.

It can be calculated that in order to reflect the image over a field of 180° the radius of curvature of the mirror to be utilized should be equal to the square root of twice the square of half the diameter of said mirror, said diameter being itself dependent on the diameter of the circular image to be projected thereon.

It is to be understood that the camera for the film to be projected differs from the arrangements described in the main patent and the first addition thereto only in the angle, relative to the vertical, of the preferential viewing axis with respect to the scene being filmed.

It should be noted, moreover, that the optical system making it possible to obtain circular images corresponding to a field of 160° to 180° and a progressive "squeezing down" of the scene at the outer edges of said field, may be utilized as a shooting device for films to be projected by the present inventive methods.

One may cite in particular as a suitable optical device for the projection of 16 mm. films the lens produced by Societe Kinoptik commercialized under the name "Super Tegea retrofocus," said lens having a focal length of 1.98 mm. and an opening of 1.9, producing a circular image whose diameter is 8 mm.

It is also possible to utilize, for the projection of 35 mm. films, the lens produced by the Nikon Cy of Japan, commercialized under the name "Fish-eye," said lens having a focal length of 8 mm. and an opening of 8, providing a circular image whose diameter is 24 mm.

It is well understood that the utilization of such lenses in viewing rooms arranged in accordance with the above-mentioned French patent and the first addition thereto is also possible, as well as the utilization of a concave mirror instead of a convex mirror in such viewing rooms.

The objects and features of the present invention will become apparent from following description of an illustrative rather than limitative new embodiment of the viewing room of the type described in the main patent, said new embodiment being of the so-called "oriented show" type, with reference to the accompanying drawings in which.

Like reference characters denote like parts throughout the several views.

Figure 1:
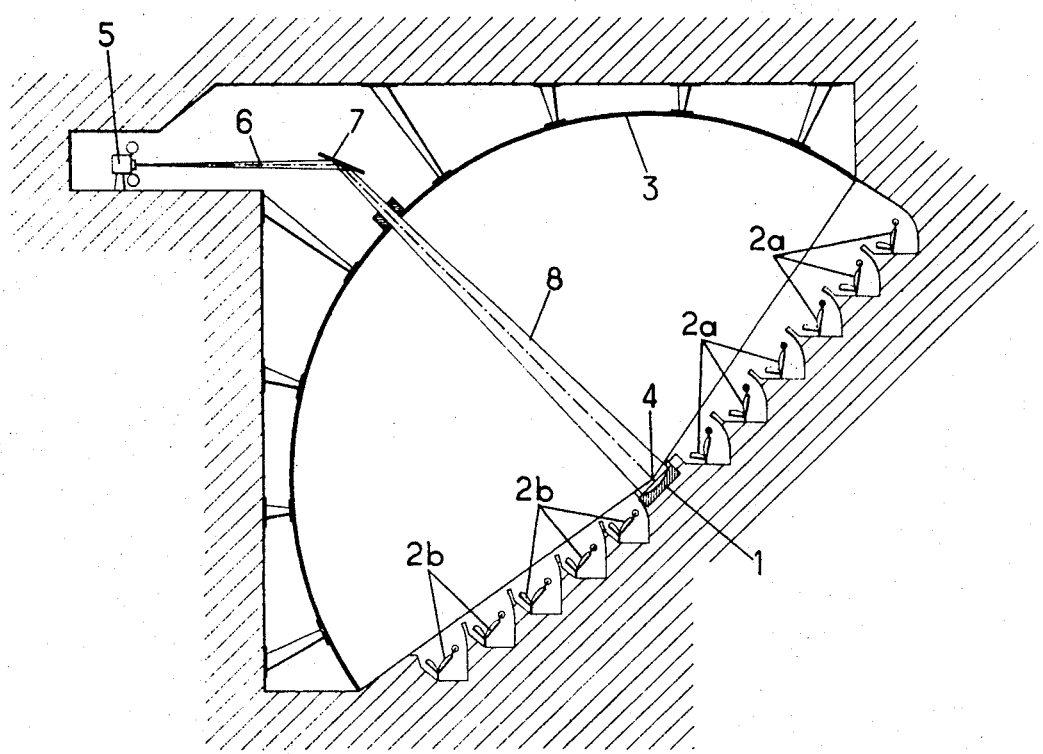
FIG. 1 is a diametral vertical section through a viewing room embodying my invention.

Referring now to FIG. 1, it can be sen that the audience is sitting on arm-chairs 2a and 2b placed on substantially straight tiers of seats to which access is had at the edges of the part-spherical screen, those stepped tiers of seats which are at a lower level than the concave part-spherical mirror 1 being positioned in a plane whose angle relative to the vertical is slightly greater than that of the corresponding plane of the upper tiers of seats so as to enable the audience seated in seats 2a and 2b, respectively located at a higher level and at a lower level than said mirror, to have a clear view of the entire image projected on the screen, principally towards the rear of said screen, even though the interest in the portion projected at the rear is oftentimes of little importance.

The screen has been given the reference number 3 and the image formed by mirror 1 adjacent the center of said screen is referenced 4 in FIG. 1.

As shown in FIG. 1, the axes of symmetry of the screen and mirror are coincident.

The projector 5 directs a light beam 6 to plane mirror 7 which reflects said image as a beam 8 along said coincident axes to concave mirror 1 which in turn reflects it on to screen 3.

Figure 2:
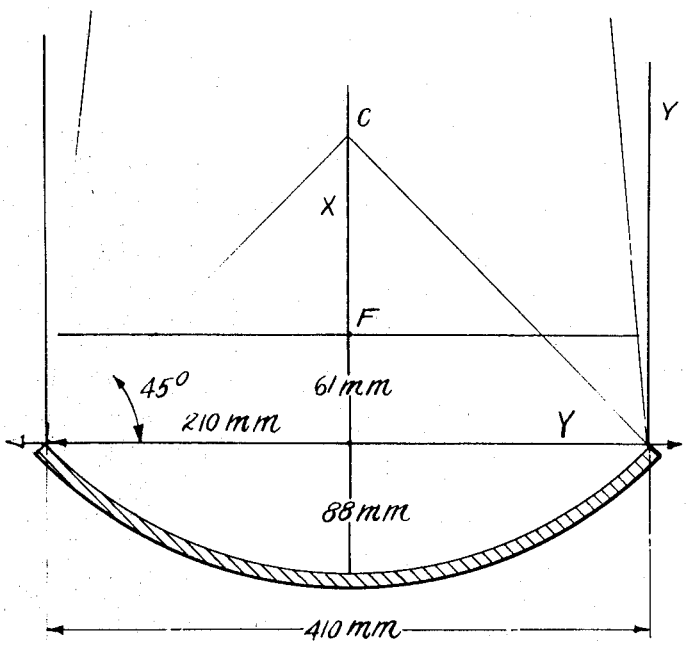
FIG. 2 is a schematic view showing the concave mirror on a larger scale and its relationship to the remainder of the optical system.

Referring now to FIG. 2, it will be seen that the mirror 1, having a diameter D is positioned with its geometrical center C and focal point F in optical alignment with the axial ray of the beam 8 from the projector, along the optical axis of the system.

The radius of curvature R of the mirror is made equal to the square root of $$\left(\frac{D}{2}\right)^2 + \left(\frac{D}{2}\right)^2$$

in order that rays incident on the peripheral parts of the mirror and parallel to the axial ray of the beam 8 may be reflected over a full 180° field. (See for example the ray Y which strikes near an edge of the mirror at an angle of 45° to its radius and is then reflected at right angles to its original path.) The length of the radius may of course be less to the extent, if any, that the screen 3 extends over less than 180°.

The real image I formed by the lens of the projector is caused to fall in the plane of the focal point P or quite close to that place, between the projector and focal point P. This requires the use in the projector of a lens having a rather long focal length to the extent that the image I is displaced from the point P along the optical axis X of the system the angular field of the image reflected by the mirror will decrease from its 180° maximum. The diameter of the image should be the same as that of the mirror.

In the particular embodiment shown in FIG. 2, the diameter of the mirror is 420 mm. The projector is selected and positioned to project an image I which is 420 mm. in diameter and positioned as shown. The radius of curvature of the mirror, which is equal to $$\sqrt{\left(\frac{420}{2}\right)^2 + \left(\frac{420}{2}\right)^2}$$

will then be approximately 298 mm., and the focal length of the mirror therefore about 149 mm.

The distance between the point F and the screen 3 is equal to the radius of curvature of the screen which is a matter of choice, so long as the point F is positioned at or just below the geometrical center of the screen. In the specific embodiment herein described the screen is 8 meters in diameter.

Figure 3:
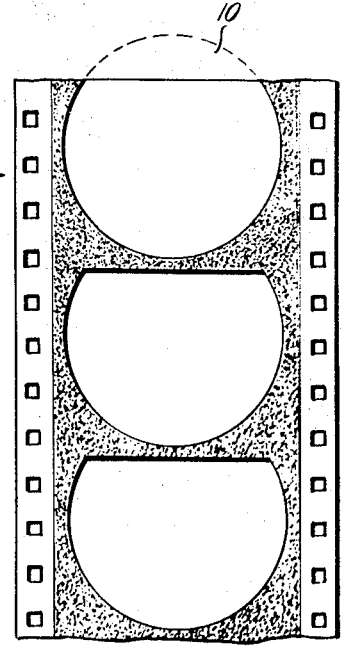
FIG. 3 shows a film for projecting picures occupying less than half of a spherical surface.
Figure 4:
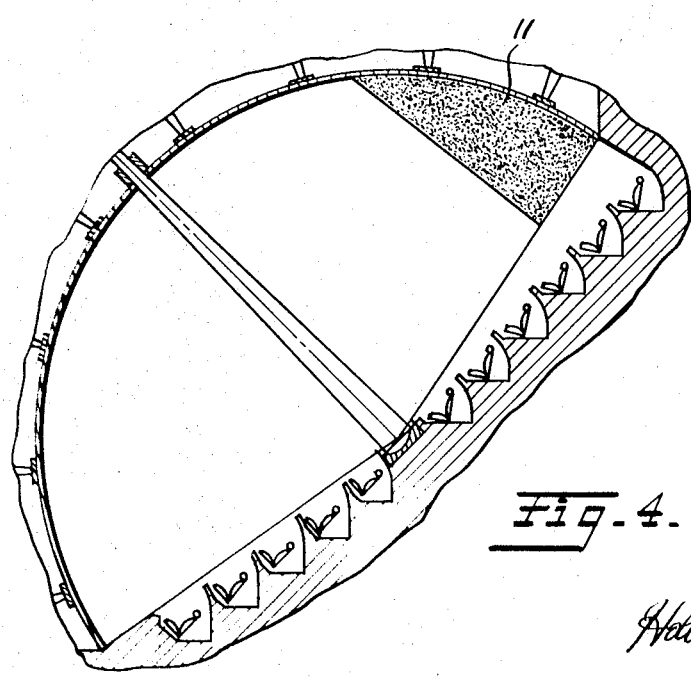
FIG. 4 shows the portion of such a surface which would be occupied by the image of a film such as that shown in FIG. 3.

Turning now to FIGS. 3 and 4, it will be seen that if, when the pictures are taken, a certain part 10 of the field of view is blocked off, thus producing a film such as that shown in FIG. 3, the corresponding portion 11 of the hemispherical screen may be ignored or eliminated.

While a particular embodiment of the present invention has been herein specifically described, other embodiments and variations are of course possible, and the scope of the patent should be construed to include all such embodiments and variations which are within the scope of the appended claims.

What is claimed is:

1. Apparatus for exhibiting a picture derived from a film made with a fish-eye lens, said apparatus comprising a screen having a concave part-spherical viewing surface, a mirror having a concave part-spherical reflecting surface facing said concave viewing surface and with its focal point positioned near the geometric center and its axis of symmetry in coincidence with that of said viewing surface, said axis of symmetry being at an acute angle to both the horizontal and the vertical, and means for projecting a real image from said film to a position near said focal point but at least as far removed from said mirror as said focal point and from which said image will be reflected by said mirror onto said viewing surface.

2. Apparatus as claimed in claim 1 in which said angle to the horizontal is no greater than 45°.

3. Apparatus as claimed in claim 1 comprising a plurality of seats facing said screen and positioned in a row beyond the periphery of said viewing surface approximately perpendicular to said axes of symmetry.

4. Apparatus as claimed in claim 3 in which said row comprises portions above and below said mirror and the row portion above said mirror is positioned at a slight angle with respect to the portion below said mirror.

5. Apparatus as claimed in claim 1 in which said projecting means is positioned to project a real image having substantially the same diameter as said mirror to said position near said focal point.

6. Apparatus as claimed in claim 5 in which the radius of curvature of said reflecting surface is substantially equal to the square root of $$2(D/2)^2$$

where D equals the diameter of the reflecting surface.

References Cited

UNITED STATES PATENTS

| | | | |
|---|---|---|---|
| 1,957,745 | 5/1934 | Wildhaber | 352—43 |
| 2,299,682 | 10/1942 | Conant | 355—18 X |
| 2,786,387 | 3/1957 | Belok | 355—18 X |

FOREIGN PATENTS

| | | |
|---|---|---|
| 1,204,643 | 2/1956 | France. |

JOHN M. HORAN, Primary Examiner